(12) United States Patent
Wimby et al.

(10) Patent No.: US 9,175,438 B2
(45) Date of Patent: Nov. 3, 2015

(54) METHOD FOR LIGNIN SEPARATION FROM BLACK LIQUOR INVOLVING MULTIPLE ACIDIFICATION STEPS

(75) Inventors: Martin Wimby, Torslanda (SE); Mattias Svensson, Örnsköldsvik (SE); Henrik Wallmo, Alingsås (SE); Fredrik Öhman, Gävle (SE); Per Tomani, Huddinge (SE); Lars-Erik Åkerlund, Sollentuna (SE)

(73) Assignee: Valmet AB, Sundsvall (SE)

( * ) Notice: Subject to any disclaimer, the term of this patent is extended or adjusted under 35 U.S.C. 154(b) by 8 days.

(21) Appl. No.: 14/357,221

(22) PCT Filed: Nov. 11, 2011

(86) PCT No.: PCT/SE2011/051360
§ 371 (c)(1),
(2), (4) Date: Nov. 27, 2014

(87) PCT Pub. No.: WO2013/070130
PCT Pub. Date: May 16, 2013

(65) Prior Publication Data
US 2015/0075738 A1     Mar. 19, 2015

(51) Int. Cl.
| D21C 11/00 | (2006.01) |
| C08H 8/00 | (2010.01) |
| C08H 7/00 | (2011.01) |
| C08L 97/00 | (2006.01) |

(52) U.S. Cl.
CPC ............. *D21C 11/0007* (2013.01); *C08H 6/00* (2013.01); *C08H 8/00* (2013.01); *C08L 97/005* (2013.01); *C08L 2205/18* (2013.01)

(58) Field of Classification Search
USPC ........................................................ 162/16, 29
See application file for complete search history.

(56) References Cited

U.S. PATENT DOCUMENTS

| 4,764,596 A | 8/1988 | Lora et al. |
| 5,777,068 A | 7/1998 | Tanaka et al. |
| 2008/0214796 A1 | 9/2008 | Tomani et al. |

FOREIGN PATENT DOCUMENTS

| NZ | WO2009028969 | 3/2009 |
| WO | WO2004013409 | 2/2004 |
| WO | WO2011037967 | 3/2011 |

*Primary Examiner* — Jacob Thomas Minskey
(74) *Attorney, Agent, or Firm* — Rolf Fasth; Fasth Law Offices

(57) ABSTRACT

The method is for separation of lignin from original black liquor ($BL_{IN}$) and has the following phases in sequence. A first precipitation phase (PR1) for precipitation of lignin by a first acidification of the original black liquor by adding a first acid or mixture of acids ($G_{1a}$) followed by a first storage phase wherein precipitated lignin particles are allowed to increase in size, followed by a second precipitation phase (PR2) for precipitation of lignin by a further acidification of the original black liquor by adding a second acid or mixture of acids ($G_{1b}$). By retaining the acidified black liquor for at least 25 minutes in the storage phase are the precipitated lignin particles allowed to grow in size and the filterability is improved considerably.

10 Claims, 6 Drawing Sheets

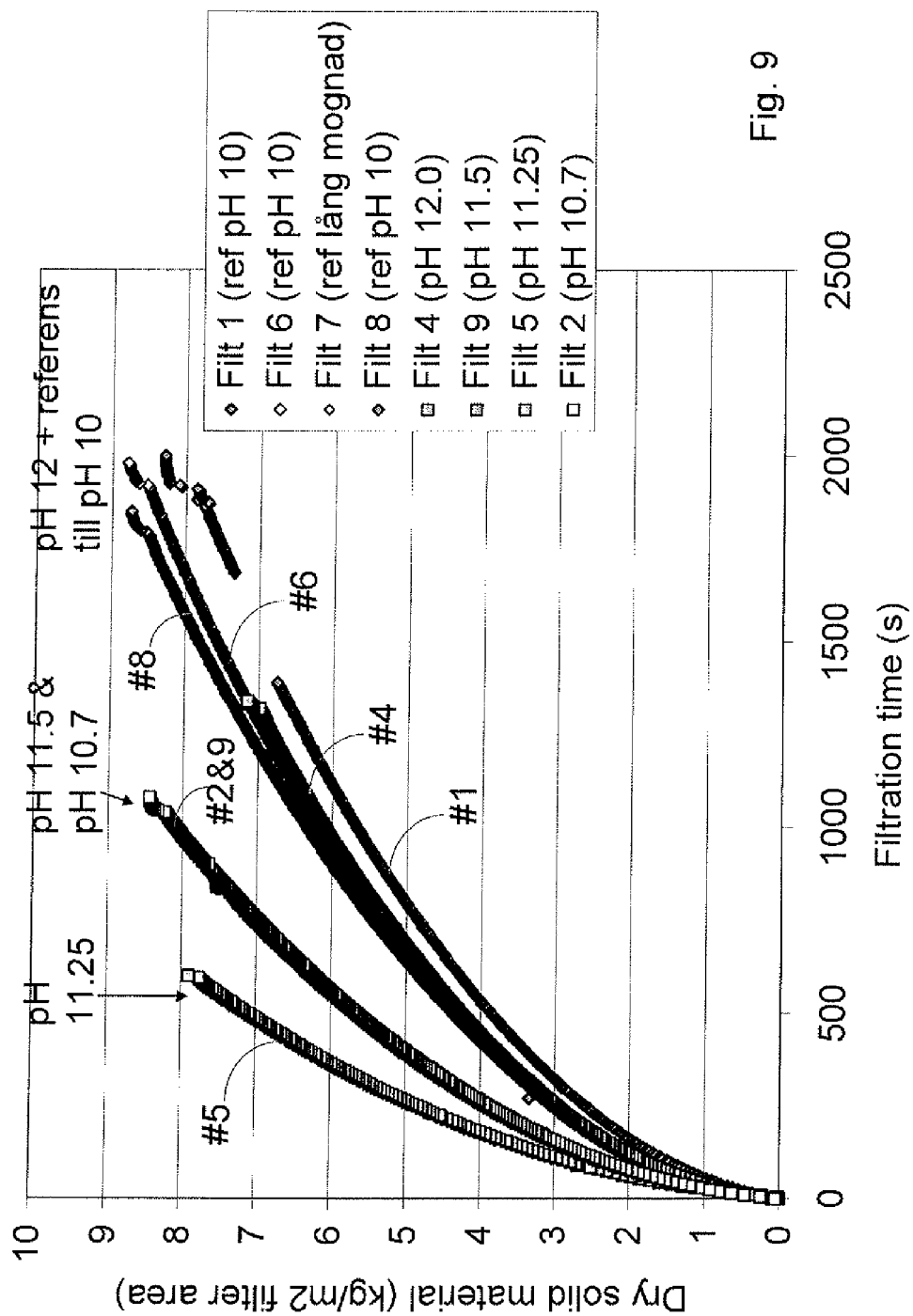

METHOD FOR LIGNIN SEPARATION FROM BLACK LIQUOR INVOLVING MULTIPLE ACIDIFICATION STEPS

PRIOR APPLICATION

This application is a U.S. national phase application that is based on and claims priority from International Application No. PCT/SE2011/051360, filed 11 Nov. 2011.

TECHNICAL FIELD

This invention relates to a method for lignin separation from spent cooking liquor, called original black liquor, using a precipitation process.

BACKGROUND

The advantages with lignin separation from black liquor is already described in WO 2006/031175 and WO2006/038863. These patents disclose the novel process Ligno-Boost™ that is now sold by Metso, and wherein WO 2006/031175 discloses the basic two stage acidic wash process and WO2006/038863 disclose an improvement of the process where sulphate or sulphate ions are added to the process.

An important aspect of the process is that the required charge of chemicals for the acidification may be high. If this is the case the cost of fresh chemicals is a large part of the operational cost and the commercial viability of the process is lower. These problems could be reduced, if the process is optimized for minimum requirement for charges of fresh chemicals, making the lignin product commercially sound. Acidifiers in form of mill generated waste flows are thus preferable as it may solve a waste disposal problem and lessen environmental impact. As the precipitation of lignin requires acidification of alkaline black liquor flows, much of the total amount of acidifier is used to decrease the pH level down to the point of where lignin starts to precipitate. The first phase reaching this pH level typically reduce the pH level from about pH 13 in the original black liquor down to a pH level about 11.5, and normally do not involve any nucleation of lignin particles. The amount of acidifier needed is nevertheless relatively high for this first phase as the pH follows a logarithmic scale, and any following additional lowering of pH from 11.5 requires far less acidifier for the same order of lowered absolute pH value.

The Lignoboost process produce a lignin product which if used as fuel is classified as a "green" fuel as being based upon recovered fuel. The idea with classification of "green" fuels is based upon the concept not to increase the carbon dioxide footprint, i.e. the emissions, by burning fossil fuels. The most promising acids for this process is carbon dioxide for at least initial precipitation of the lignin, and then using sulfuric acid ($H_2SO_4$) for washing and leaching out metals from the lignin. The sulfuric acid could be added as a fresh sulfuric acid from a chemical supplier, or as preferred using so called "spent acid" from a chlorine dioxide generator often used at a pulp mill. The latter usage of this spent acid already at hand in most mill sites further emphasize that the lignin product is considered as a "green" fuel.

Another problem with the process disclosed in WO 2006/031175 is that there may be a disposal problem with the strongly odorous $H_2S$ gases that are emitted from the reslurrying tank and bled out from the process, and it is suggested that these hydrogen sulfides could be added to the pulping process in order to increase sulfidity and possibly increase the yield in the pulping process. However, such rerouting of the strongly odorous $H_2S$ gases to another part of the pulp mill introduces risks for emissions of these gases during transport and storage. It is far better to use these gases at the location or process producing these gases.

As the chemical constitution of the original black liquor may change during operation, typically due to changes in the pulping process as of changes in wood material used or cooking conditions, the first precipitation process for precipitating lignin particles from the original black liquor may need adaption to the present conditions. As differing requirements apply for the first precipitation phase, where mainly lowering of pH is the objective, and the second precipitation phase, where lignin starts to precipitate it will be difficult to design a system that meets both these requirements.

As the precipitated lignin needs to be separated from the acidified black liquor slurry, which still is kept alkaline at a pH level above 7, it is important that the filterability of the precipitated lignin is high. If the filterability is improved could smaller separation equipment be used, and less investments is needed.

SUMMARY OF THE INVENTION

The invention is based upon the surprising finding that the precipitation process should be divided into at least two distinctive phases, each adapted for the present phase in the precipitation phase and having its own supply of acidifier, and that the initially acidified black liquor volume after the first phase should be kept in a storage vessel allowing the acidified black liquor to mature before starting the final acidification. By such retention of the acidified black liquor in a storage vessel could the filterability be improved almost trefold compared to an acidification without such storage.

Thus, the invention is related to a method for separation of lignin from original black liquor having a first pH value, comprising the following phases in sequence:

a first precipitation phase wherein a first acidifier charge is added to the original black liquor in order to decrease the pH value of the original black liquor to a second pH level whereby less than 10% of the total lignin content is precipitated as nucleus particles, said second pH level being at least 1 pH unit below that of the first pH value, a first storage phase (ST) wherein the original black liquor is kept at or below the second pH level for a retention time of at least 25 minutes during which storage phase the precipitated lignin particles increase in size thus increasing the filterability of the precipitated lignin a second precipitation phase wherein a second acidifier charge is added to the acidified original black liquor from the first precipitation phase in order to decrease the pH value to a third pH level whereby more than 20% of the total lignin content is additionally precipitated and preferably as growth of nucleus lignin particles formed after the first storage phase, said third pH level being at least 1 pH units below that of the second pH value, followed by a separation phase wherein the precipitated lignin is separated from the remaining liquid phase of the acidified original black liquor.

By this method could precipitation be adapted for each individual phase with its individual charge of acidifier, charged in order to meet the objective of each phase.

Preferably is 50-80% of the total lignin content in original black liquor ($BL_{IN}$) precipitated in total after the second precipitation phase, and that the pH level of the acidified original black liquor is still alkaline, i.e. has a pH level above 7.0 and preferably about 10, after the second precipitation phase. By this embodiment could a part of the total lignin content, typically about 70%, be extracted from the original black liquor, still keeping a part of the heat value of the treated black liquor for any subsequent combustion in a recovery boiler, and the remaining liquid part of the original black liquor could be mixed back into the major part of the original black liquor not causing any problems associated with mixing of acidic waste flows to black liquor.

According to one preferred embodiment is also at least one of the first or second acidifier charges comprising acidifying gas. I.e. liquid acidifier could also be used, but acidic waste gases are often available at a pulp mill and a potential environmental pollution if not destructed in expensive waste gas cleaning systems. It is thus preferable to use these gases as acidifiers in the inventive method. Preferably the acidifying gas is rich in carbon dioxide, and may have its origin from flue gases vented from a lime kiln which naturally contains large amounts of carbon dioxide.

As the inventive method includes at least two distinct phases using acidifying gas charged could at least a part of the flow path of the first acidifying gas led trough the first precipitation phase have a random flow path constantly changing flow direction at no straight flow path longer than 5 centimeter, preferably less than 1 centimeter, said flow path created by random packing of filling bodies in said flow path. Such a routing of the gases trough the flow of black liquor increase the dissolving capacity of the acidifying gas and hence obtain a same pH in said phase with less charge of acidifier gas or lower pH with similar charge. The filling bodies used could preferably be of a type similar to Rachig-rings normally used in gas contacting columns or filters, or other shape of irregular filling bodies.

In a further embodiment could also at least a part of the flow path of the original black liquor from the first precipitation phase led trough the second precipitation phase have an open flow path allowing a straight flow path longer than 5 centimeter, with flow restrictions allowing precipitated lignin to move with the flow of the black liquor with a flow deflection of the precipitated lignin being less than 80 degrees in relation to the general flow direction of the black liquor trough the second precipitation phase, hence allowing any precipitated lignin particles flow with at least one flow vector being parallel to the general flow. By this design could be avoided that precipitated lignin may block the flow path of the black liquor and totally stop the process.

In yet a further embodiment of the inventive method using acidifier gas is the original black liquor flowing downwards in the first precipitation phase wherein a first acidifier gas is led countercurrent to flow of original black liquor. This embodiment may enable longer retention time of the acidifier in the flow of black liquor, and increase the dissolving capacity of the acidifying gas.

As an alternative embodiment of the inventive method is the original black liquor flowing upwards in the first precipitation phase wherein a first acidifier gas is led concurrent with flow of original black liquor. This may be preferable if a lower concentration of acidifier gas is needed in the position where precipitation of lignin nucleus particle may start, as high concentration of acidifier gas may result in excessive formation of small nucleus particles instead of lignin particle growth.

Most of the acidifier needed for acidification and precipitation of the lignin from the black liquor could be obtained from flue gases vented from a lime kiln at the mill site. Typically the content of carbon dioxide in these flues gases is well above 25%. By using these flue gases for acidification and precipitation would emissions from the lime kiln in aspects of carbon dioxide be reduced significantly, and no fresh carbon dioxide needs to be added to the Lignoboost process. Only by using the flue gases from the lime kiln could the pH of the black liquor be lowered by 1.5 to 2.5 units, i.e. from an original pH level above pH 13 down to a pH level in the order of 11.5, thus only initiating a smaller first precipitate fraction of lignin from the original black liquor mostly containing small lignin nucleus particles In yet a preferred embodiment of the inventive method is at least a part of the flue gases vented from the lime kiln first used for dewatering the lignin cake before being used as acidifier in the first precipitation phase. This improves the dewatering of the lignin product as well as takes care of any environmental problems with dust emissions from the dewatering phase. The dust would then be brought into the precipitation phase and collected in the lignin product precipitated.

In a further preferred embodiment of the invention are also further carbon dioxide and $H_2S$ gases emitted from second acidification phase in the Lignoboost process re circulated and mixed with the original black liquor in the first precipitation phase. By using this re-circulation could almost the entire need for added acidifier in the precipitation phase be fulfilled by using only lime kiln flue gases and internal gases from the process. If the Lignoboost process is implemented to precipitate lignin from a semi-evaporated original black liquor having a concentration of solids of about 42%, could as much as 9.6 ton of lignin per hour be precipitated from a black liquor flow of about 103m$^3$/h.

The $H_2S$ gases that are emitted from the reslurrying tank in the Lignoboost process contain a large amount of residual carbon dioxide, $CO_2$. By re-circulating this $H_2S$ and $CO_2$ rich gas back to the first acidification phase a corresponding reduction of addition of the fresh carbon dioxide is obtained. Only by using the flue gases from the lime kiln in a first phase could the pH of the black liquor be lowered by 1.5 to 2.5 units, i.e. from an original pH level above pH 13 down to a pH level in the order of 11.5, thus initiating a first precipitate fraction of lignin from the original black liquor, and re circulation of the $H_2S$ gases emitted from second acidification phase to the precipitation phase could lower the pH further down from 11.5 down to a pH level in. the order of 11.2, thus initiating a second larger precipitate fraction of lignin from the original black liquor.

As indicated above could the precipitation stage be implemented in first and second phases which either could be implemented in one and the same vessel or in two separate vessels. When the precipitation stage comprises two separate precipitation phases, treating the original black liquor in series, could at least a part of the gases rich in carbon dioxide and having its origin from flue gases vented from a lime kiln be added to the first phase of the first precipitation stage. As the lime kiln flue gases comes in great volumes could this absorption process for the carbon dioxide content be optimized for these large gas volumes.

If the precipitation stage comprises two separate precipitation phases, then the waste gases emitted from the second acidification stage could be re circulated and mixed with the original black liquor in the second phase of the first precipitation stage.

The carbon dioxide formed in the reslurrying tank, originates from the sulphides and carbonates content in the lignin cake. These compounds react with the acidifier and forms carbon dioxide ($CO_2$) and hydrogen sulfide ($H_2S$), according to:

$$CO_3^{2-}+2H^+ <-> CO_2+H_2O$$

$$HCO_3^-+H^+ <-> CO_2+H_2O$$

$S^{2-} + 2H^+ <\!-\!> H_2S$ $HS^- + H^+ <\!-\!> H_2S$

The formation of carbon dioxide in this process enables a further source for carbon dioxide needed for the first acidification phase, and the hydrogen sulfide is also a net contributor to the acidification as the $pK_a$ value of hydrogen sulfide is 6.89.

In a further preferred embodiment of the inventive method are the flue gases vented from a lime kiln first used for dewatering the lignin cake or lignin product in at least one of the first, second and/or third dewatering stages before being used as acidifier in the precipitation stage. This usage of the hot flue gases as means for dewatering the lignin cake or lignin product could in one or several positions of the Lignoboost process be implemented in parallel or preferably in series by sending the flue gases countercurrent to the lignin flow through the process.

In a further preferred embodiment of the inventive method is the entire process, from the second acidification stage, i.e. excluding the first precipitation stage which is kept alkaline, and until obtaining the final lignin product, kept at acidic conditions below pH 6. Preferably the entire process from the second acidification stage is kept at acidic conditions even below pH 4. The pH level throughout the process is most preferred at a pH from 1 to 3.5. This would prevent any separated lignin from being dissolved again, and the precipitated lignin would be subjected to repeat leaching of metals and other unwanted components, meeting the objectives of obtaining a clean lignin product at high yield.

The inventive method may also include the additional steps of combining the pH level adjustment with an adjustment of the ion strength, preferably by using alkali metal ions or alkaline earth metal ions, most preferred calcium ions.

It is intended throughout the present description that the expression "dewatering" embraces any means of dewatering. Preferably the dewatering is performed by using centrifugation, a filter press apparatus, a band filter, a rotary filter, such as a drum filter, or a sedimentation tank, or similar equipment, most preferred a filter press apparatus is used.

It is intended throughout the present description that the expression "original black liquor" embraces spent cooking liquor from a digester, having most of the lignin from the original cellulose material dissolved in the "original black liquor". The "original black liquor" may also have a large content of organic and inorganic material, but may also have passed through separation processes for extracting turpentine or other specific constituents, while keeping the bulk volume of dissolved lignin unaltered.

It is intended throughout the present description that the expression "lime kiln" embraces the conversion plant in the recovery island where the calcium carbonate in the lime mud obtained in the recaustizising plant is calcined to calcium oxide and reused in the lime cycle.

SHORT DESCRIPTION OF THE FIGURES

FIG. 6 shows a process chart of one example of implementation of the inventive precipitation process using two vessels for the different phases of the precipitation stage and a storage vessel in-between;

DETAILED DESCRIPTION OF THE INVENTION

Figure 1:
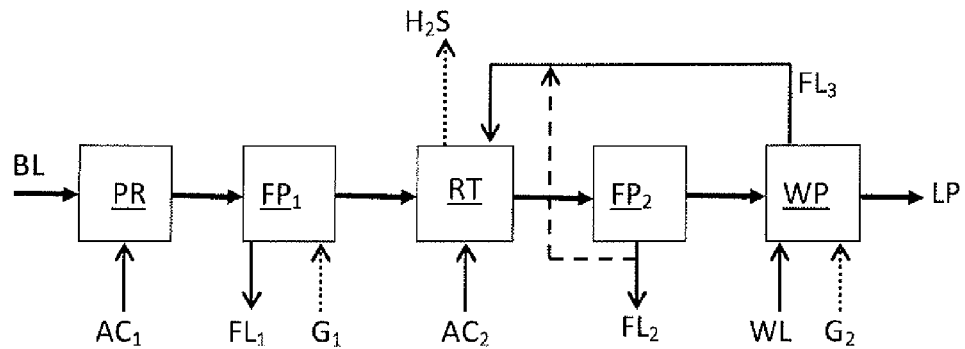
FIG. 1 shows the prior art lignin separation process according to WO 2006/031175.

In FIG. 1 is the known prior art process according to WO 2006/031175 shown. The separation of lignin from original black liquor BL comprising the following stages in sequence:

a) Precipitation of lignin by a first acidification stage of the original black liquor $BL_{IN}$ by adding a first acid or mixture of acids $AC_1$, in any suitable precipitation reactor PR, b) followed by dewatering while forming a first filter cake with high content of lignin, said dewatering made in any suitable filter press $FP_1$, which may drain a first filtrate $FL_1$ from the lignin suspension and have addition of gas blow trough $G_1$ of the lignin cake in order to displace any residual acidic liquor, c) suspending the first lignin filter cake obtained in stage b in a second acidification stage using a second acid or mixture of acids $AC_2$, said suspension made in any suitable reslurry tank RT while discarding the odorous gases $H_2S$ emitted, d) whereupon a second lignin suspension is obtained in the reslurry tank RT, e) dewatering of the second lignin suspension forming a second filter/lignin cake with high content of lignin, said dewatering made in any suitable filter press $FP_2$, which may drain a second filtrate $FL_2$ from the lignin suspension, and at least a portion of this second filtrate $FL_2$ may be re-circulated back to stage c, f) washing the second filter cake, said washing made in any suitable wash apparatus WP, adding a wash liquid WL to this washing stage, and finally g) dewatering of the washed second lignin cake obtaining a lignin product LP, said dewatering preferably made in the last stages of the wash apparatus WP, which may drain a third filtrate $FL_3$ from the second filter/lignin cake, and at least a portion of this second filtrate $FL_2$ may be re-circulated back to stage c, and may also have addition of gas blow trough $G_2$ of the lignin cake in order to displace any residual acidic liquor.

Figure 2:
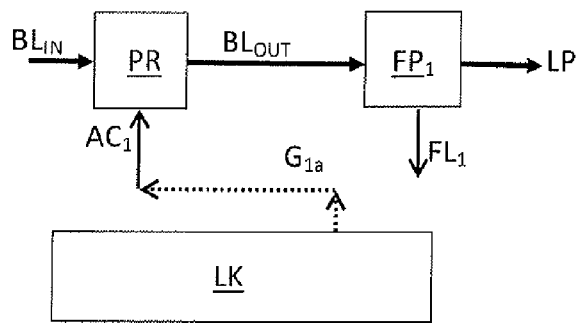
FIG. 2 shows usage of lime kiln gases in the precipitation stage.

In FIG. 2 are the basic steps of the precipitation process according to WO 2006/031175 shown. In this figure are flue gases $G_{1a}$ obtained from a lime kiln LK sent directly to the precipitation stage PR. According to preferred embodiments of the invention should at least a part of the first acid or mixture of acids added to the first precipitation stage be gases rich in carbon dioxide and having its origin from flue gases vented from a lime kiln, meaning that the flue gases could be sent directly or indirectly to the precipitation stage.

Figure 3:
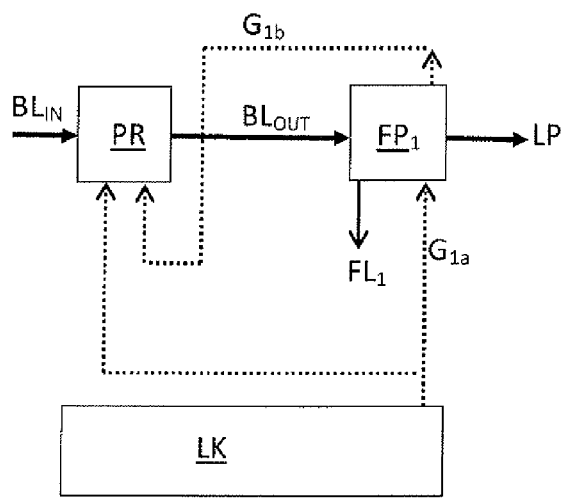
FIG. 3 shows usage of lime kiln gases in the precipitation stage as well as using at least a part of the lime kiln gases for dewatering the lignin cake/product.

In FIG. 3 is shown a further preferred embodiment the precipitation process according to WO 2006/031175. Here are at least a part of the flue gases $G_{1a}$ vented from a lime kiln LK first used for dewatering the lignin cake before being used as acidifier in the first precipitation stage, and the displaced residual gases $G_{1b}$ is also added to the precipitation stage PR together with lime kiln gases $G_{1a}$ sent directly to the precipitation stage.

Figure 4:
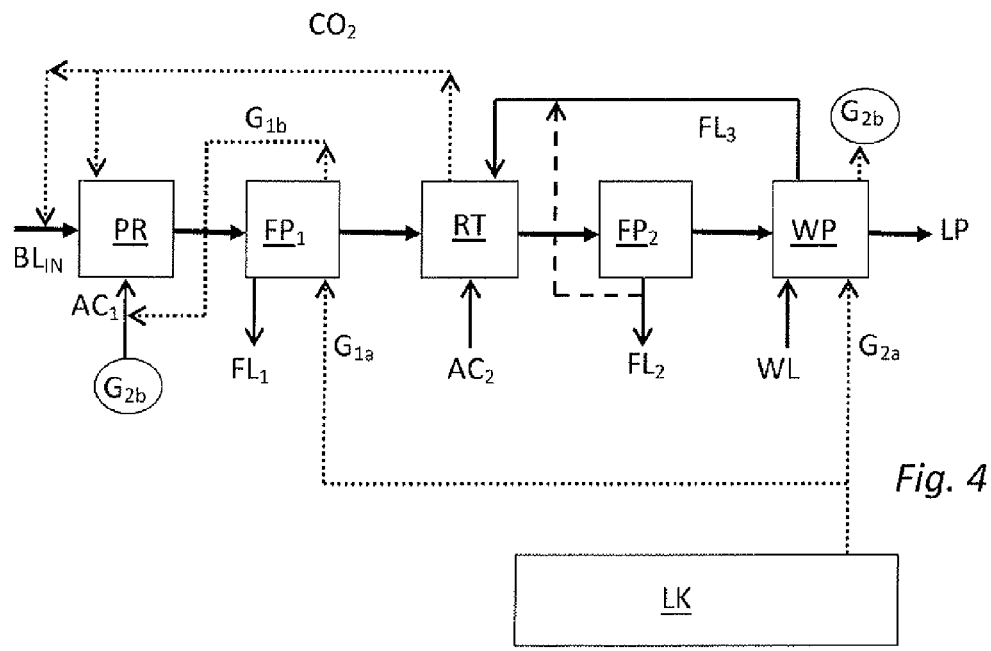
FIG. 4 shows usage of lime kiln gases in parallel in dewatering stages.

In FIG. 4 is shown a further preferred embodiment of the precipitation process according to WO 2006/031175. As disclosed earlier is the first precipitation stage PR and first dewatering stage $FP_1$ is followed by a suspension stage RT wherein the first lignin filter cake is suspended in a second acidification stage using a second acid or mixture of acids $AC_2$, whereupon a second lignin suspension is obtained. This stage is thereafter followed by a second dewatering stage $FP_2$ of the second lignin suspension forming a second filter cake with high content of lignin. A washing stage WP follows for washing the second filter cake and finally followed by a third dewatering stage of the washed second lignin cake obtaining a lignin product LP. According to the preferred embodiments of the inventive method are also the waste gases $H_2S$ & $CO_2$ emitted from the second acidification stage RT re circulated and mixed with the original black liquor in the first precipitation stage PR. In this embodiment are the lime kiln gases sent directly and in parallel flows $G_{1a}$ and $G_{2a}$ to the dewatering stages $FP_1$ and WP, and the displaced residual gases $G_{1b}$ and $G_{2b}$ from these dewatering stages are collected and added to the precipitation stage PR. Here are no flue gases from the lime kiln sent directly to the precipitation stage, but rather via said dewatering stages.

Figure 5:
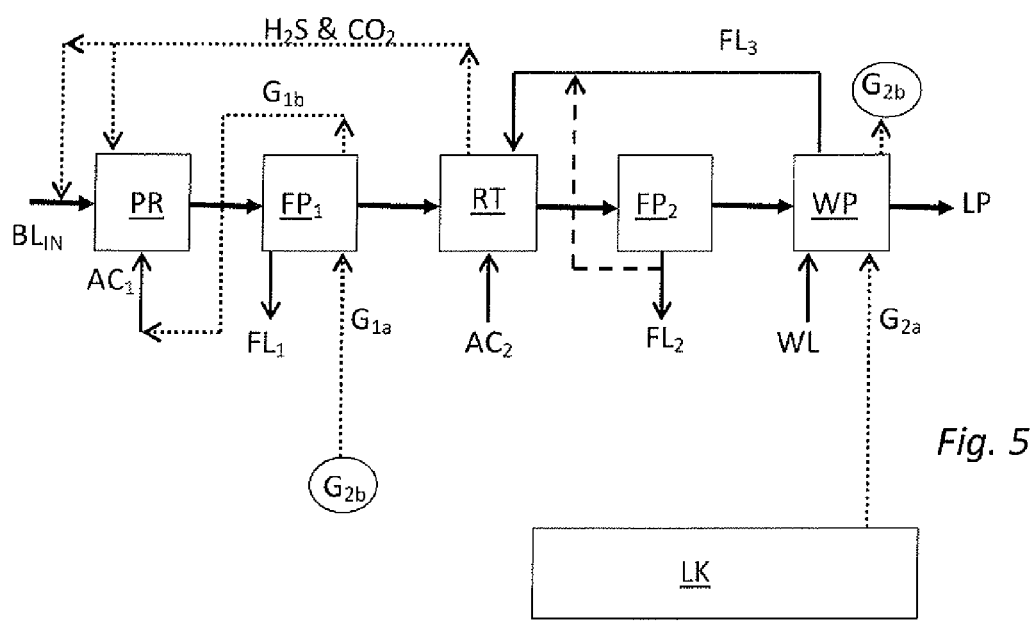
FIG. 5 shows usage of flue gases from lime kiln in series in several dewatering stages.

In FIG. 5 is shown an alternative embodiment of FIG. 4. In this embodiment is the lime kiln gases sent directly to the last dewatering stage WP, and the displaced residual gases $G_{2b}$ from this last dewatering stage are collected and added to a preceding dewatering stage, here $FP_1$. The displaced residual gases $G_{1b}$ from this preceding dewatering stage are collected and added to precipitation stage PR. Here are no flue gases from the lime kiln sent directly to the precipitation stage, but rather via usage in said dewatering stages and countercurrent to flow of lignin trough the process.

As could be understood from these examples of embodiments could direct feed and/or indirect feed to precipitation stage via dewatering stages of lime kiln flue gases be implemented in any possible ratio.

An additional procedure for stabilizing the lignin during the 2-stage process is, in combination with a pH-decrease, to adjust the ionic strength in the slurry stage, preferably with multivalent alkali metal ions or alkaline earth metal ions (e.g. calcium). At a given pH, a higher ionic strength in the suspension stage reduces the lignin yield losses. Here would also the ionic strength and pH of the wash water essentially corresponds to the conditions in the slurry stage to avoid gradients during the washing process. A higher ionic strength in the slurry and in the wash water gives a stable lignin and high lignin yield even at pH-values in the upper acidic range.

EXAMPLE

Figure 6:
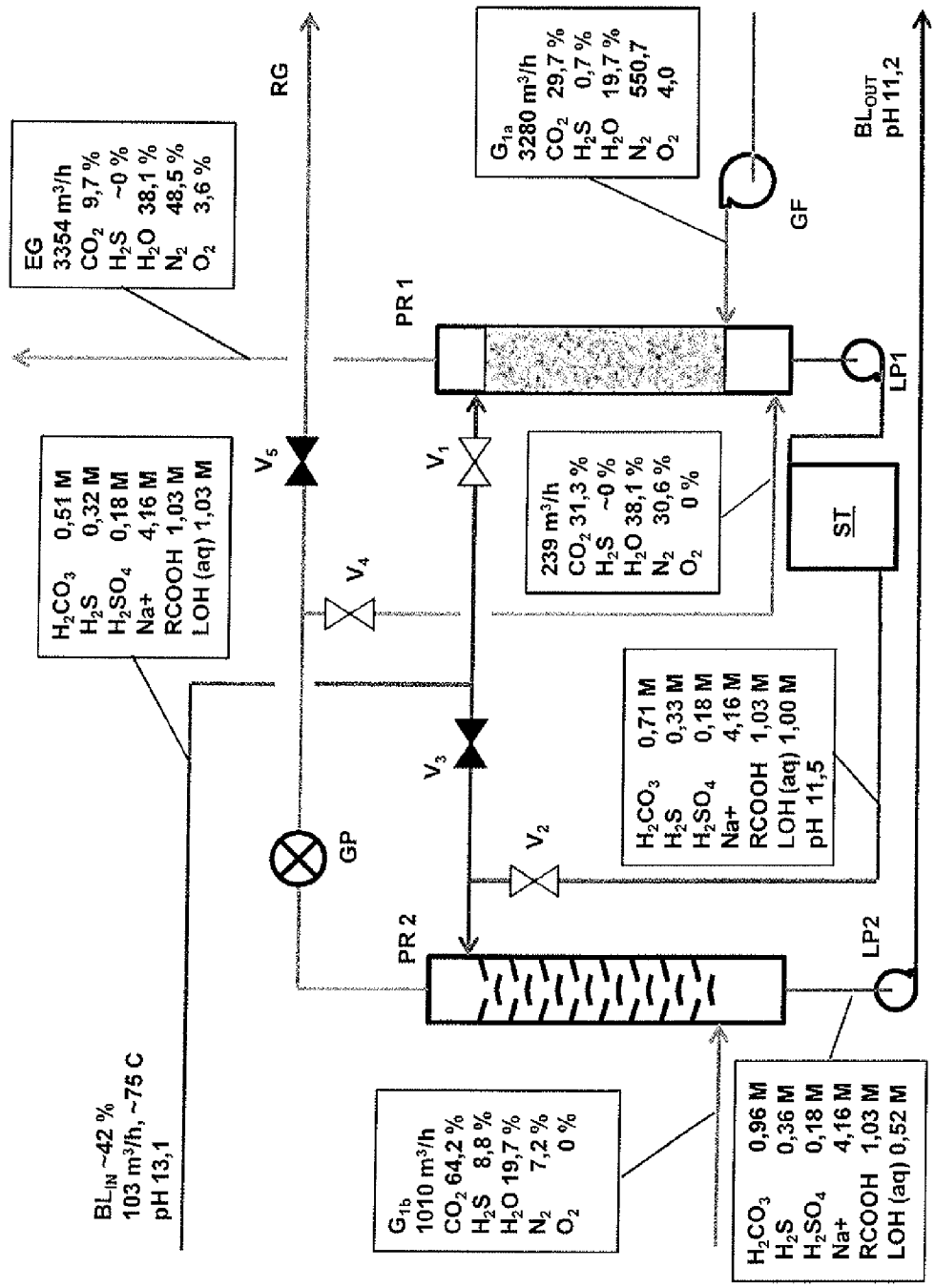

In FIG. 6 are shown typical process conditions for a two phase precipitation stage.

The actual example is using original black liquor from a kraft pulping process for softwood having a pH level of 13.1 and a dry matter content of 42%, and the figures may differ when using other black liquors.

Here are shown 2 carbonizing towers or vessels, PR1 and PR2, connected in series and with a storage vessel ST in-between. For the understanding of the flow through the towers are open valves $V_1$, $V_2$, $V_4$ white and closed valves $V_3$, $V_5$, black-filled. The chemical content of each flow is indicated in boxes either as total concentration in molecular concentration M or in percentage.

The original black liquor $BL_{IN}$ is fed to the top of the first tower PR1 via open valve $V_1$, and flows downwards to liquid pump LP1.

The carbonizing towers, PR1 and PR2 are preferably of differing design as to interior flow paths. The towers could be of simple elongated vertical design with a square section. The first carbonizing tower PR1 fed with original black liquor $BL_{IN}$ is optimized for maximum contact area between the black liquor and added acidifying gas and may contain a random packing of filling bodies, preferably of a type like Rachig-rings or other shapes of irregular filling bodies, said filling bodies preferably having no dimension larger than 5 centimeter.

The filling bodies are so selected and installed in said tower such that at least a part of the flow path of the first acidifying gas led trough the first precipitation phase has a random flow path constantly changing flow direction at no straight flow path longer than 5 centimeter, preferably less than 1 centimeter, said flow path created by random packing of filling bodies in said flow path.

After the first carbonizing tower PR1 is the acidified black liquor pumped to a storage vessel ST wherein the acidified black liquor is allowed to mature for at least 25 minutes.

The second carbonizing tower PR2 fed with acidified original black liquor from the storage tower is optimized for avoiding blockage from any precipitated lignin particles. If an undulated and extended gas flow path is sought for in order to increase contact time between gas and black liquor and hence increase the dissolving capacity of acidifying gas could simple inclined lamellas be installed.

These lamellas are introduced to slow down the ascending motion of gas trough the tower and increase contact time between gas and liquid phase in order to dissolve most of the carbon dioxide. The inclination of lamellas should enable precipitate to fall downwards towards outlet and avoid accumulation of precipitate.

The inclined lamellas are so selected and installed in said tower such that at least a part of the flow path of the original black liquor from the first precipitation phase led trough the second precipitation phase has an open flow path allowing a straight flow path longer than 5 centimeter, with flow restrictions allowing precipitated lignin to move with the flow of the black liquor with a flow deflection of the precipitated lignin being less than 80 degrees in relation to the general flow direction of the black liquor trough the second precipitation phase, hence allowing any precipitated lignin particles flow with at least one flow vector being parallel to the general flow.

For handling some 100 m³/h of original black liquor could the height of the tower be some 8-10 meters, and the square section have a dimension of 1.4×1.4 meter for the first tower PR1 and 1×1 meter for the second tower PR2.

The lime kiln gases $G_{1a}$ (corresponding to FIG. 3) are added to the bottom of the first tower PR1 via a flue gas pump GF, and any residual gases EG may be vented to atmosphere. As shown here is a large part of the carbon dioxide content in the flue gases dissolved in the first tower PR1, from 29.7% down to 9.7%. The pH of the original black liquor is also lowered as a consequence from pH 13.1 down to 11.5. A first small fraction of lignin is thus precipitated in this first phase of the precipitation stage in the first tower as the amount of lignin in liquid form, LOH (aq), drops from 1.03 M down to 1.00 M, i.e. only less than 3% of the total lignin content. This small part of lignin precipitate only contains small lignin nucleus particles that are less prone to block the filling of the first tower PR1.

After this first phase is the black liquor, now at pH 11.5, fed to the storage tower ST.

In this storage tower the acidified black liquor is allowed to mature.

After the storage tower is the black liquor fed to the top of the second tower PR2 via open valve $V_2$, and flows downwards before being fed out from the second precipitation phase via liquid pump LP2.

Lime kiln flue gases $G_{1b}$ (corresponding to FIG. 3) having passed a dewatering stage are added to the bottom of the second tower PR2, and any residual gases RG may be sent for combustion in a boiler, preferably the recovery boiler. As shown here is a large part of the carbon dioxide content in the flue gases dissolved in the second tower PR2 as the pH of the original black liquor is further lowered to pH 11.2. A second larger fraction of lignin is thus additionally precipitated as well in this second phase of the precipitation stage in the second tower as the amount of lignin in liquid form, LOH (aq), drops from 1.00 M down to 0.52 M, i.e. in total a precipitation in this phase of about 48% dissolved lignin fed to this stage.

In total it was found with these conditions that as much as 9.6 ton of lignin per hour was precipitated in these 2 phases, from a flow of original black liquor in the order of 103 m³/h at a concentration of 42%.

Figure 7:
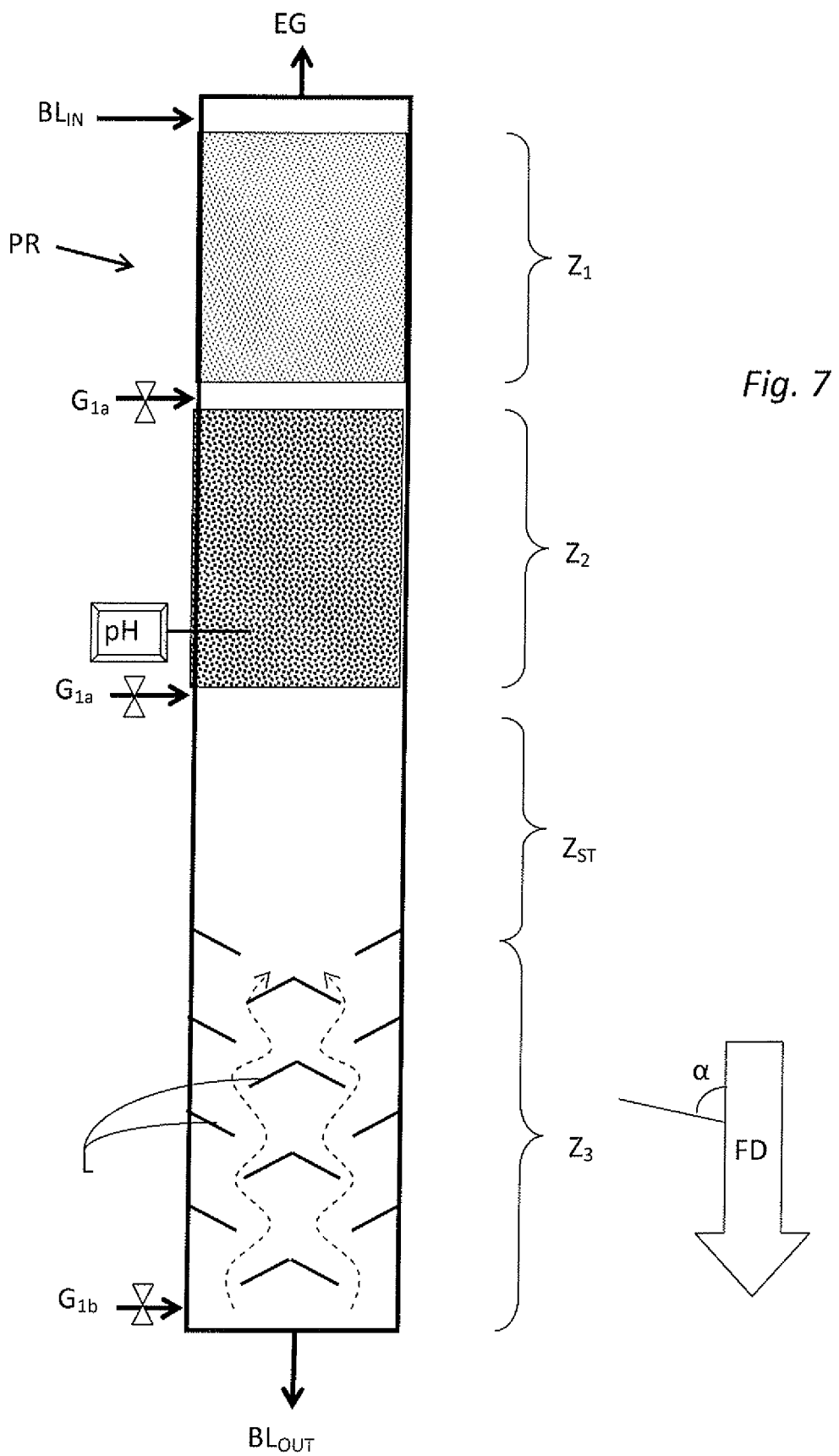
FIG. 7 shows an alternative implementation of the inventive method using a single vessel for several phases of the precipitation stage, FIG. 8 show an alternative implementation of the inventive method using three vessels for several phases of the precipitation stage, FIG. 9 show results as of filterability of precipitated lignin using different process conditions.

In FIG. 7 is an alternative embodiment with a single tower design for the precipitation stage. Here is shown 4 phases $Z_1/Z_2/Z_{ST}/Z_3$ in said tower having differing packing with filling bodies and lamellas. Here is the original black liquor $BL_{IN}$ fed in to the top of the tower and reaches a first phase $Z_1$ filled with small size filling bodies. Acidifying gas is added below this first phase via $G_{1a}$ and flows upwardly against the descending flow of black liquor. Residual gas is vented via EG.

Thereafter is the partly acidified black liquor from the first phase descending down trough a second phase $Z_2$ filled with small size filling bodies preferably with a larger size than those filling bodies of the first phase. Acidifying gas is added also below this second phase via $G_{1a}$ and flows upwardly against the descending flow of black liquor.

After the second phase is the further acidified black liquor from the second phase descending down trough a third storage phase $Z_{ST}$. Here the acidified black liquor is allowed to mature.

After the third storage phase is the acidified black liquor from the third storage phase descending down trough a fourth phase $Z_3$.

The pH level at lower part of the second phase is preferably monitored by at least a pH measurement as indicated to enable control of that the pH is close to condition for lignin particle precipitation of any significant order (preferably no more than small percentage at this position).

The actual pH level where lignin precipitation reaches higher values than 2-5% may differ from the pH level identified in test, but in general this level is typically about pH 11.5.

In this fourth phase $Z_3$ (similar to the second phase in FIG. 6) are the lamellas installed such that flow of the acidified black liquor is led trough the last phase has an open flow path allowing a straight flow path longer than 5 centimeter. Preferably the flow restrictions, i.e. lamellas L, allow precipitated lignin to move with the flow of the black liquor. As indicate with the arrow FD is indicated the general flow direction trough this last phase, and the deflection angle α is preferably less than 80 degrees in relation to the general flow direction FD of the black liquor trough the second precipitation phase. This deflection allows any precipitated lignin particles to be flushed out and flow with at least one flow vector being parallel to the general flow FD. If the deflection angle is 90 degrees could a stagnant zone be created and lignin particles may start to accumulate.

Figure 8:
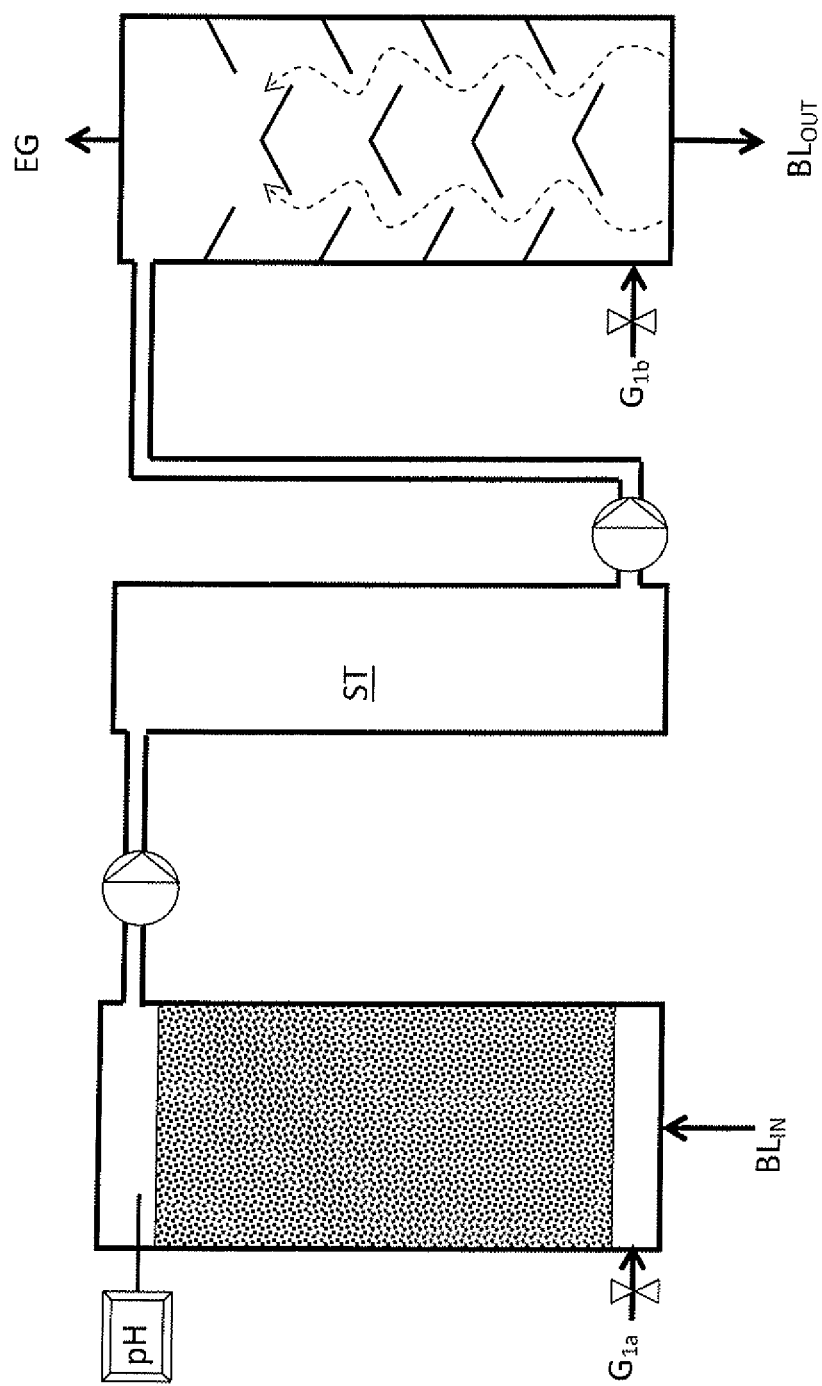

In FIG. 8 is yet an alternative embodiment with a three tower design for the precipitation stage. Here is shown a first acidification phase in an up flow tower, followed by a storage phase in a storage tower, and finally a third acidification phase in a down flow tower, with dense packing with filling bodies in the first up flow tower.

In FIG. 9 are shown differing results as of filterability of the precipitated lignin using different acidification modes. This plot shows the amount of dry solids material, i.e. lignin precipitate, in kg per square meter filter area, on the y-axis as a function of filtration time on the x-axis.

Curve #1 (Filt 1) shows results from a process where the lignin is precipitated by lowering the pH down to pH 10 without any intermediate storage during the acidification. It indicates that the filterability is fairly low needing a filtration time of about 2000 seconds in order to obtain 8 kg of precipitate per square meter filter area.

Curve #2 (Filt 2) show results from a two step acidification, first to pH 10.7 and then finally to pH 10 with an intermediate storage time of 60 minutes. It indicates that the filterability is improved considerably only needing a filtration time of about 1000 seconds in order to obtain 8 kg of precipitate per square meter filter area.

Curve #9 (Filt 9) show results from a two step acidification, first to pH 11.5 and then finally to pH 10 with an intermediate storage time of 60 minutes. It indicates that the filterability is improved considerably only needing a filtration time of about 1000 seconds in order to obtain 8 kg of precipitate per square meter filter area.

Curve #5 (Filt 5) show results from a two step acidification, first to pH 11.25 and then finally to pH 10 with an intermediate storage time of 60 minutes. It indicates that the filterability is improved even further as compared to curves #2 and #9, only needing a filtration time of about 500 seconds in order to obtain 8 kg of precipitate per square meter filter area.

The results from tests shown in FIG. 9 indicate a potential for improved filterability when using a 2-stage acidification of the lignin precipitation with an intermediate storage between the acidification stages. For the specific black liquor tested, having a starting pH of about 13.1 in all examples, it shows that the filterability could be improved almost 100% (by reducing filtration time from 2000 to 1000 seconds) by using an intermediate storage after acidification to a pH of about 11.5 or 10.7 in a first acidification stage. There is also a possibility to find an optimum point of filterability, as shown in curve #5, showing that the filterability could be improved further almost 100% as compared with curves #2 and 9 (by reducing filtration time from 1000 to 500 seconds) by using an intermediate storage after acidification to a pH of about 11.25 in a first acidification stage.

It is however likely that the absolute optimal point in pH after the first acidification stage may change depending on the specific black liquor, i.e. may change between different pulp mills.

The reason for improved filterability is likely due to a phenomenon identified as Ostwald ripening, that is allowed to occur during the storage time. Ostwald ripening is a phenomenon where, over time, precipitated small lignin particles dissolve and redeposit onto larger precipitated lignin particles. This redeposition onto larger lignin particles occurs because larger particles are more energetically favored than smaller particles. While keeping the pH fairly constant during the storage time would no new precipitation of small lignin particles/nucleus be induced due to further reduction of pH, and the lignin particle growth of the initially precipitated lignin is instead favored.

Any further precipitation of lignin in the following second acidification phase then predominately take place as lignin particle growth of the particles formed during the storage.

As the Ostwald ripening effect is a change of an inhomogeneous structure over time, should the storage time be implemented so that most of this effect could come into effect and the storage time should be at least 25 minutes. Any increase in storage time above this minimum time is likely to increase the particle size and thus improve the filterability of the final lignin particles. However, tests have shown that most part of this effect has been obtained after 45 minutes and only marginal supplemental effects has been shown by extending the storage time more than 60 to 90 minutes. As there is an investment cost associated with any storage vessel which increase with size is a storage time of about 60 minutes a commercially sound selection. It is to be noted that if the filtration capacity is improved such that the filtration time is reduced by 50% could much smaller separation equipment be selected.

If a reference filter is used for the separation process after a treatment according to curve #1, then a filter with only about 50% of this reference filter area would be necessary after treatment according to curves #2 and #9. And if the optimal treatment according to curve #5 is used, then only about 25% of this reference filter area would be necessary.

It is to be noted that only a part of the lignin content is sought for precipitation, as the residual black liquor $BL_{OUT}$ is sent to the conventional recovery process, and thus a certain amount of lignin is needed in order to maintain some of the combustible content, i.e. heat value, for the recovery boiler. Thus, it is of importance that the residual black liquor after the precipitation process still is alkaline and do not add problems in the subsequent recovery process. The Lignoboost process is thus ideal for overloaded mills where the recovery operations in the evaporation plant or in the recovery boiler has reached its operational limit, and further capacity for handling increased black liquor volumes is needed. Instead could the capacity of the pulping process be increased, and the increased black liquor volumes are met with a complementary process producing a "green" fuel of great value.

While the present invention has been described in accordance with preferred compositions and embodiments, it is to be understood that certain substitutions and alterations may be made thereto without departing from the spirit and scope of the following claims.

We claim:

1. A method for separation of lignin from original black liquor ($BL_{IN}$) having a first pH value, comprising the following phases in sequence:
    a first precipitation phase (PR 1) wherein a first acidifier charge is added to the original black liquor in order to decrease the pH value of the original black liquor to a second pH level whereby less than 10% of the total lignin content is precipitated as nucleus particles, said second pH level being at least 1 pH unit below that of the first pH value,
    a first storage phase (ST) wherein the original black liquor is kept at or below the second pH level for a retention time of at least 25 minutes during which storage phase the precipitated lignin particles increase in size thus increasing the filterability of the precipitated lignin,
    a second precipitation phase (PR 2) wherein a second acidifier charge is added to the acidified original black liquor from the first precipitation phase in order to decrease the pH value to a third pH level whereby more than 20% of the total lignin content is additionally precipitated and as growth of nucleus lignin particles formed after the first storage phase, said third pH level being at least 1 pH units below that of the second pH value, and
    followed by a separation phase wherein the precipitated lignin is separated from the remaining liquid phase of the acidified original black liquor.

2. A method according to claim 1 wherein the retention time in the storage phase is at least 45 minutes.

3. A method according to claim 2 wherein 50-80% of the total lignin content in original black liquor ($BL_{IN}$) is precipitated in total after the second precipitation phase, and that the pH level of the acidified original black liquor is still alkaline and has a pH level above 7.0 after the second precipitation phase.

4. A method according to claim 1 wherein at least one of the first or second acidifier charge comprises acidifying gas.

5. A method according to claim 4 wherein the acidifying gas is rich in carbon dioxide.

6. A method according to claim 4 wherein the acidifying gas has its origin from flue gases vented from a lime kiln (LK).

7. A method according to claim 4 wherein at least a part of the flow path of the first acidifying gas ($G_{1a}$) led through the first precipitation phase has a random flow path constantly changing flow direction at no straight flow path longer than 5 centimeter, said flow path created by random packing of filling bodies in said flow path.

8. A method according to claim 4 wherein at least a part of the flow path of the original black liquor from the first precipitation phase led through the second precipitation phase has an open flow path allowing a straight flow path longer than 5 centimeter, with flow restrictions allowing precipitated lignin to move with the flow of the black liquor with a flow deflection of the precipitated lignin being less than 80 degrees in relation to the general flow direction of the black liquor through the second precipitation phase, allowing any precipitated lignin particles flow with at least one flow vector being parallel to the general flow.

9. A method according to claim 7 wherein the original black liquor ($BL_{IN}$) is flowing downwards in the first precipitation phase (PR 1) wherein a first acidifier gas is led countercurrent to flow of original black liquor.

10. A method according to claim 7 wherein the original black liquor ($BL_{IN}$) is flowing upwards in the first precipitation phase (PR 1) wherein a first acidifier gas is led concurrent with flow of original black liquor.

* * * * *